Nov. 14, 1961 J. T. TUCKER, JR 3,008,362
POWER OPERATED STUD TENSIONERS
Filed March 20, 1959 2 Sheets-Sheet 2

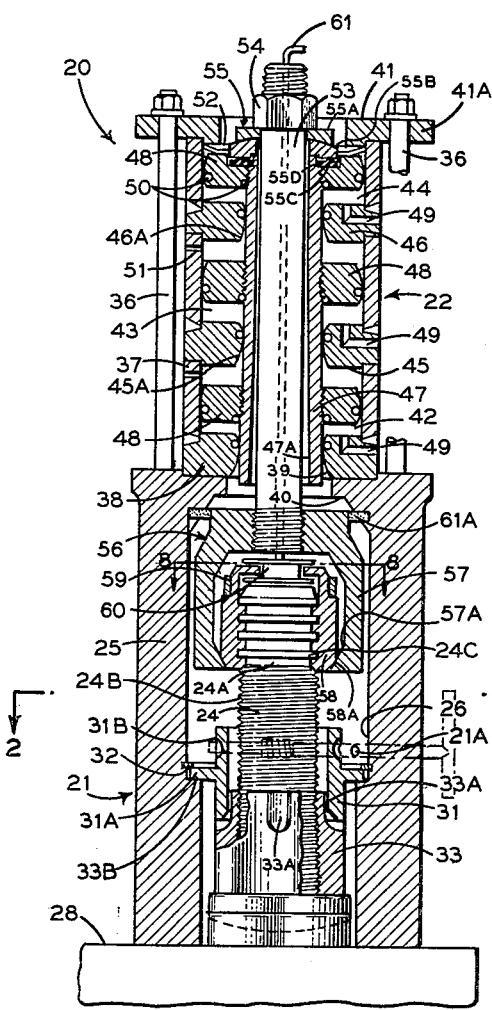
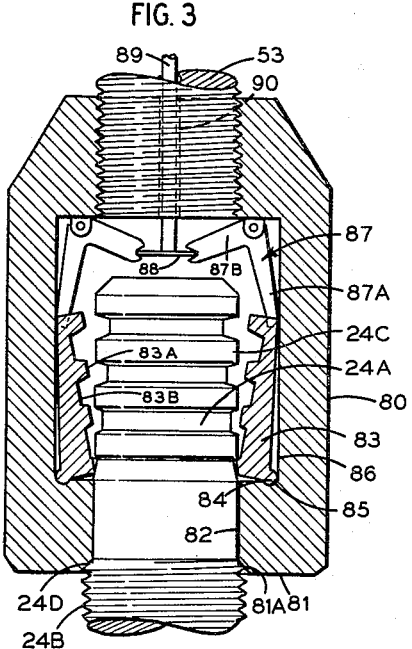
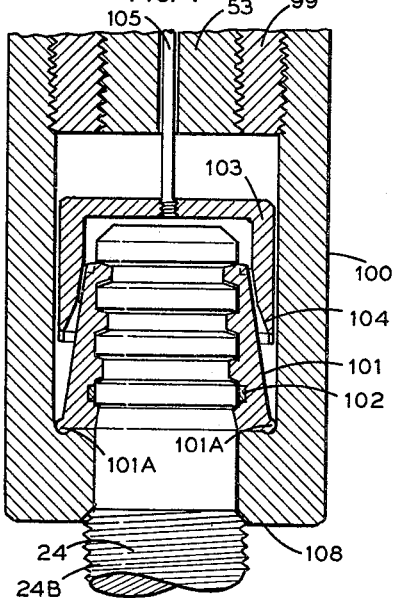
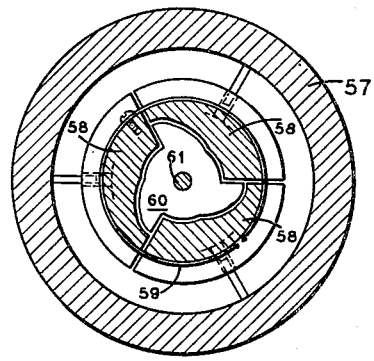

INVENTOR.
James T. Tucker, Jr.
BY
*J. P. Moran*
ATTORNEY

United States Patent Office 3,008,362
Patented Nov. 14, 1961

3,008,362
POWER OPERATED STUD TENSIONERS
James T. Tucker, Jr., Barberton, Ohio, assignor to The Babcock & Wilcox Company, New York, N.Y., a corporation of New Jersey
Filed Mar. 20, 1959, Ser. No. 800,731
22 Claims. (Cl. 81—54)

This invention relates to tensioners and more particularly to an improved fluid actuated stud or bolt tensioner.

The stud or bolt tensioner of the present invention, although not restricted thereto, is particularly useful in assembling and disassembling a closure to a body of a high pressure vessel. The advantages of a pressure vessel design having a closure secured thereto by a plurality of stud and nut assemblies, for use as autoclaves, chemical reactors, or the like, and the modern trend toward higher internal operating pressures for such vessels brought into prominence the need for a means by which relatively large stud and nut assemblies, required for such vessels, can be readily assembled and disassembled without damaging the vessel or any of its component parts.

In order that the closure for such a vessel be properly secured, it is essential that the compressive force at the line of juncture between the closure and the body of the vessel be uniformly applied in a manner as to avoid over-stressing of the parts while at the same time effecting a fluid tight seal therebetween. For this reason it is important that the amount of tension placed in each of the studs be controlled so that the stresses in the studs are maintained within the elastic limit of their material and yet be sufficient to effect an adequate and uniform pull-down or compressive force between the closure and the vessel body.

Heretofore, in performing a closure operation on a high pressure vessel, it had been customary to simply stress the studs in tension by turning down the nuts manually by means of a wrench or by thermally expanding the stud. However, each of these methods proved inaccurate, time consuming and generally unsatisfactory.

Hydraulically operated jacks means have also been heretofore resorted to for physically stretching studs in tension. While hydraulically operated stud tensions are not basically new, the known constructions proved unsatisfactory for making a closure in the event of misalignment between the stud assembly and the flange of a pressure vessel and/or between the stud and tensioner.

Also some of the known fluid operated tensioners were unsatisfactory because they could not be properly supported on the vessel flange. For this reason these tensioners, when a fluid pressure was applied thereto, were subjected to uneven loading resulting in stress concentrations which plastically deformed the structures thereof. Successive loadings merely aggravated the condition and increased the deformations, thus causing the tensioners to set on the flange in a misaligned position relative to the stud.

Since the prior known hydraulic stud tensioners were unable to compensate for misalignment between the tensioner and the stud, as, e.g., that occasioned by the rotation of the vessel flange due to the extremely high loads exerted thereon by the tensioner in stretching the stud in tension or by misplacement with respect to the stud, the prior known tensioners were subjected to an undesirable bending load, which resulted in galling and damaging the parts thereof. As the stud size requirements increased to 4 inches or more in diameter, thereby subjecting the flanges to even greater loads, the problem of misalignment or non-uniaxial loading occasioned between the tensioner and the stud assembly posed serious problems.

These known tensioners were further constructed so that the entire tensioner was required to be threaded to each stud. As a result the top stud thread was required to take the entire weight of the tensioner. This construction not only rendered the positioning of the tensioner on each stud a difficult and time consuming operation, it also greatly enhanced the probability of damage to the stud threads during initial threading of the tensioner thereto.

An object of this invention is to overcome the foregoing disadvantages by providing an improved fluid actuated stud tensioner for conveniently stressing studs in tension accurately and uniformly in a relatively short period of time.

Another object is to provide an improved fluid actuated stud tensioner for use on a flanged pressure vessel which is able to compensate for axial misalignment between the tensioner and stud due to flange rotation and/or to misalignment due to misplacement of the stud with respect to the vessel flange.

Still another object is to provide for a mechanical stud tensioner which is particularly adaptable for remote control operation.

Still another object is to provide a means for greatly reducing the amount of time required to make and break a seal for a high pressure vessel.

Still another object is to provide an improved fluid actuated stud tensioner which greatly facilitates the assembly and disassembly of the tensioner to a stud while at the same time materially diminishing the probability of inflicting thread damage thereto.

In accordance with this invention the foregoing objects and other features and advantages are attained by a stud tensioner comprising essentially a pedestal or stud housing, a power pack unit in the form of a cylinder and piston assembly connected to the pedestal, and a pull rod means constructed and arranged so as to be readily attached and detached to both the stud and the cylinder and piston assembly. According to this invention the piston means is slidably mounted within the cylinder and comprises a piston head connected to a hollow piston rod.

In assembled position, the pull rod forms an axial extension of the studs and projects upwardly through the pedestal and hollow piston rod. A thrust nut releasably connects the upper end of the pull rod to the piston with means disposed therebetween to provide for angular and lateral displacement of the pull rod relative to the cylinder and piston-pedestal assembly to compensate for axial misalignment between the stud and tensioner. Means for introducing a fluid into the cylinder is provided to move the piston in a manner to exert a force in tension on the pull rod, which in turn is transmitted to the stud. With the stud stressed in tension, a nut turning mechanism at the base of the pedestal is provided for engaging and rotating the mating nut onto the stud to take up and retain the stud elongation.

A feature of this invention resides in the provision of means allowing the pull rod to be angularly displaced relative to the centerline of the tensioner as occasioned by flange rotation and/or misplacement of tensioner relative to the stud and thereby compensate for misalignment between the stud and tensioner to prevent binding of the piston in the cylinder and allowing the tensioner to pull evenly and uniformly during multiple operation.

Another feature of this invention resides in the provision wherein the pull rod is rendered readily detachable relative to both the stud and piston.

Another feature resides in the provision that the assembly of the tensioner is such that the stud thread need not support the entire weight of the tensioner.

Still another feature resides in the provision that the facility of the readily releasable pull rod renders the pedestal and power unit assembly readily adaptable for use on studs of different size within a given range.

Another feature resides in the provision that the fine threads on the studs need not extend beyond the nut to receive the pull rod and therefore are not exposed to damage.

Other features and advantages will be readily apparent when considered in view of the drawings and description in which:

FIG. 1 is a vertical sectional view of the improved stud tensioner.

FIG. 3 is a sectional view of a modified form of the tensioner stud gripping means.

FIG. 4 is a longitudinal sectional view of another modified embodiment of the stud gripping means.

FIG. 8 is a detail sectional plan view taken on line 8—8 of FIG. 1.

Figure 7:
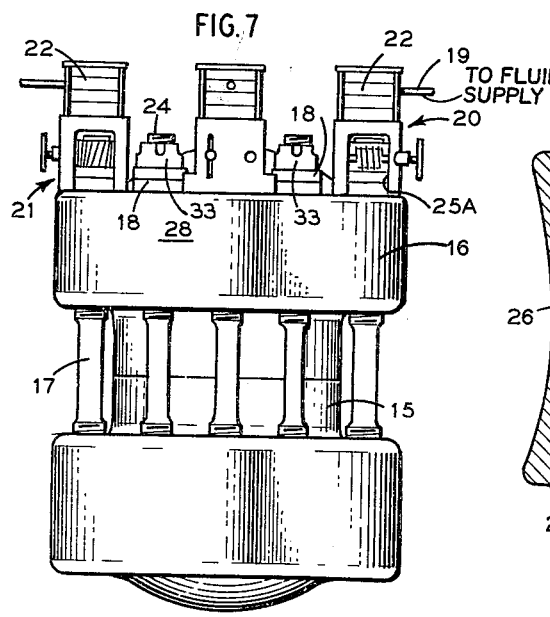
FIG. 7 is a pictorial view illustrating multiple application of the stud tensioner in conjunction with a pressure vessel.

For the purpose of disclosure the improved tensioner of this invention is herein illustrated and described as it is utilized in conjunction with a pressure vessel 15, FIG. 7, having a flanged closure 16 secured thereto by a plurality of stud and nut assemblies 17. Generally included as part of each stud and nut assembly are spherical washers 18 which provide a normal bearing surface for the stud nuts 33.

The tensioner 20 of this invention comprises a pedestal 21, a power pack unit 22 which is in the form of a fluid actuated piston and cylinder assembly secured to the pedestal, and a pull rod 53 detachably connected to both a stud 24 to be stressed and the power pack unit 22 which loads the stud.

Figure 2:
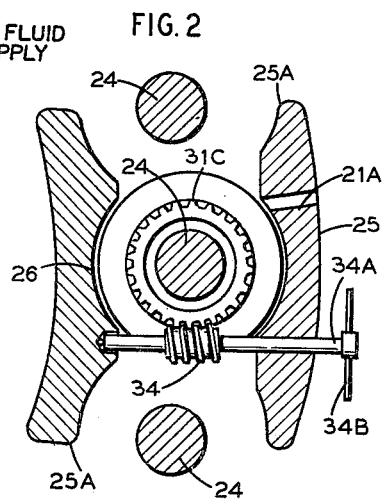
FIG. 2 is a sectional plan view taken along line 2—2 of FIG. 1.

The pedestal 21, which forms the support and main compressive member of the tensioner is preferably formed of high strength steel having definite elastic properties. It consists of a body 25 provided with an axially extending bore 26 for receiving a stud and nut assembly. Because of the close spacing between adjacent studs 24, it may be necessary to provide the body 25 with opposed open ends 25A, as illustrated in FIGS. 2 and 7, in order for the tensioner to clear the adjacent studs when in operation.

According to this invention the pedestal 21 and vessel flange 28 are designed so that when the pedestal 21 is positioned over a stud and nut assembly, the base of the pedestal is seated entirely within the periphery of the flange, see FIG. 7. This provides adequate bearing area for the tensioner on opposite sides of the stud. Because of the compatible arrangement between the pedestal 21 and the flange 28, the pedestal is uniformly loaded as the stud is stressed. Thus damaging stress concentration in the pedestal resulting from unequal loading is eliminated.

A nut turning mechanism in the nature of a nut socket 31 is disposed in the bottom portion of the pedestal 21 and is maintained therein by means of a connected radial flange 31A disposed between a retaining ring 32 and an inwardly extending shoulder 33B. As shown, the socket 31 is designed to mate with a castellated nut 33. According to this invention sufficient clearance is provided between the mating surfaces of the nut 33 and socket 31 to acommodate any slight eccentricity of the faces of the nut relative to the bore thereof. Sufficient clearance is also provided between the socket 31 and the internal surface of the pedestal bore 26. This clearance is to prevent binding between the socket and pedestal in case of any misalignment between the longitudinal axis of the tensioner and that of the stud. To protect the fine threads of the stud from damage, the castellations of the nut are provided with webbed portions 33A. Thus the nut socket 31 is prevented from making contact with the threads.

Rotation of the nut socket 31 is accomplished by a gearing arrangement. As shown in FIGS. 1 and 2, the upper portion 31B of the socket 31 is provided with gear teeth 31C which are arranged to mesh with a worm gear 34 connected to a shaft 34A supported on the pedestal 21. A suitable means or handle 34B is provided to turn the worm shaft 34A. If desired, the shaft 34A may be linked for remote control operation. Consequently the arrangement described is readily adapted for either direct manual operation or for remote control operation.

As shown in FIGS. 1 and 2 the pedestal 21 is provided with an opening 21A through which an impact tool or punch (not shown) may be inserted in the event an additional force is required to loosen or unfreeze the nut 33. As shown the opening 21A is disposed opposite that portion of the socket 31 having the gear teeth 31C so that the tool when inserted through opening 21A may engage the teeth 31C. Normally, rotation of the nut 33 is accomplished by the gearing arrangement of the worm 34 meshing with teeth 31C of the socket 31.

Secured to the upper portion of the pedestal 21 by means of tie rods 36 is the power pack unit 22. According to this invention the power pack unit consists essentially of a fluid actuated cylinder and piston assembly. As illustrated, the assembly includes a cylinder 37 having a bottom plate 38 arranged with a central opening 39 in axial alignment with the bore 26 of the pedestal. As shown the upper portion of the bore 26 is tapered upwardly and inwardly to provide a shoulder 40 for supporting the cylinder 37. An anchor plate 41 extending across the top of cylinder 37 and having extending flanged portions receiving the tie rods 36 secures the cylinder 37 firmly to the pedestal 21.

In the illustrated embodiment the cylinder 37 is partitioned into one or more expansive fluid receiving chambers by vertically spaced members. For example, an arrangement of three expansive chambers 42, 43 and 44 formed by spaced members 45 and 46 is shown and described. The partition members 45 and 46 like the bottom plate 38 are rigidly secured to the walls of cylinder 37 and each is provided with a central opening 45A, 46A, respectively, in axial alignment with the bore 26 of the pedestal. The arrangement is such that the bottom member 38 and intermediate partition members 45, 46 constitute the fixed bottom walls for the respective, expansive fluid receiving chambers 42, 43 and 44.

The piston assembly consists of a hollow piston or push rod 47 which extends axially through the aligned openings 39, 45A and 46A of the bottom plate 38 and partition members 45, 46, respectively. As illustrated, three piston heads 48 are connected in series to the hollow piston rod 47. Each head 48 is threaded to the piston rod at vertically spaced intervals to form the movable upper wall portion of the respective fluid receiving chambers 42, 43 and 44.

While the cylinder and piston assembly described may be actuated pneumatically, the illustrated embodiment is hydraulically operated. Means in the form of passageway 49 are provided in each of the fixed partition members 38, 45, 46 for introducing a hydraulic fluid up through the bottom of the respective fluid receiving chambers 42, 43 and 44. These passages are connected to suitable lines 19, FIG. 7, connecting to a source of an actuating fluid supply (not shown). To minimize the loss of fluid around the end of the piston heads 48 and cylinder walls, suitable sealing rings 50 are provided as shown.

According to this invention cylinder vents 51 are provided as a safety feature to prevent piston leakage from damaging or breaking the tensioner by filling of the space above the respective piston heads 48. Further the piston heads and fixed cylinder bottom walls at the seals 50 are provided with rounded edge portions. The rounding of the edges at the piston and cylinder seals prevents the deflection of these parts from rubbing and scoring the cylinder walls. This construction results in preventing excessive leakages and in attaining increased seal life. Consequently, maintenance of the power pack unit is greatly reduced.

Since the three pistons in accordance with this invention are attached to a common piston rod, a relatively thin conical spring washer or belleville spring 52 is utilized which, in addition to the weight of the piston, aids to return the piston assembly to start position. The relatively flat spring 52 and the single disc pistons permit the power pack to be very compact, thereby requiring only a small head room. This is an important consideration particularly when the tensioner is to be used in conjunction with a pressure vessel installed on board a ship where space limitation oftentimes is very critical.

The pull rod assembly is detachable as to both the stud 24 and the power pack 22. The assembly consists of a pull rod 53 which has connected at one end a means 56 for detachably engaging a stud. The other end of the rod extends upwardly through bore 26 and hollow piston rod 47. A thrust nut 54 secures the pull rod 53 to the piston. While the pull rod is detachable, it cannot be separated from the tensioner without first removing the nut socket 31. An intended purpose for the nut 54 is to adjust for chuck elevation so that it will properly engage studs having slightly varying heights with respect to a vessel flange. Another purpose of nut 54 is to set the elevation of the chuck 56 so that the nut will be free of the spherical washers 55 when a 45° chamfer at the base of the chuck is engaging a similar chamfer on the stud. This freedom at the top will allow lateral alignment to occur between the tensioner and the pull rod and the stud assembly.

According to this invention means are provided to compensate for axial misalignment between the centerline of the pedestal-power pack assembly and the axis of the stud occasioned by flange rotation, lateral misplacement of the tensioner relative to the stud or uneven bearing surface. The means for compensating for misalignment includes a spherical washer set 55 interposed on the pull rod 53 between the thrust nut 54 and the piston, and adequate clearance between the hollow piston rod and the pull rod extending upwardly therethrough. As shown, the spherical washer set includes an upper washer 55A provided with a bottom concave surface which is adapted to mate with a lower washer 55B having an upper convex surface. To assist the spherical washer set to compensate for misalignment while heavily loaded, the washer set is mounted on a resilient member, e.g., a rubber seating washer 55C. In accordance with this invention the rubber seating washer is positioned in an annular groove 55D disposed in the upper piston head immediately below the spherical washer 55B. Thus under loading conditions too great to permit relative movement between washers 55A and 55B to correct for the total misalignment incurred, further misalignment of the related parts is compensated for by the floatation or displacement of the washer set 55, as occasioned by the non-uniform flow of the resilient washer material confined within the spaces defined by the walls of the groove and the bottom surface of the lower washer 55B. Thus relative movement of the washers in the spherical washer set 55 will permit initial angular displacement to occur between the centerline of the tensioner and the centerline of the stud to compensate for any misalignment without imposing any bending loads thereto when the load is applied. Seating the washer set 55 on a rubber seating washer 55C thus permits for additional correction to occur between the tensioner and stud during the loading operation. As shown, the clearance between the hollow piston 47 and pull rod 53 may be attained by providing the piston rod 47 with a bore 47A which tapers downwardly and outwardly. The outward flare of the bore 42A at the lower end provides for the necessary clearance to compensate for any angular displacement, while the diameter of the bore 47A adjacent the upper end thereof is sufficient to accommodate for lateral displacement between the centerlines of the stud and tensioner, while at the same time providing a bearing area adjacent the top of the piston rod which is close to the pull rod. Thus the load when applied is brought closer to the center of the pull rod. With this construction the spherical washer set 55 is not subjected to severe bending loads and for this reason the thickness requirement of the washers 55A, 55B can be maintained within optimum limits.

In the absence of a spherical washer arrangement described, the misalignment occasioned by flange rotation would impart bending loads to both the tensioner and stud. This would result in the pistons galling and scoring the cylinder walls. Consequently severe damage would be likely to occur to the tensioner.

As shown in FIG. 1, the readily releasable stud receiving portion of the pull rod consists of a quick acting chuck mechanism 56 by which the pull rod can be readily attached and detached to the stud 24. This mechanism consists primarily of a chuck housing 57 threaded to the lower end of the pull rod 53. Disposed within the housing 57 is a jaw assembly consisting of three jaw members 58 which are maintained in a normally biased closed position by a flat or split ring spring member 59. The upper ends of each jaw are inwardly turned and engaged with a rotating eccentric cam 60. A control rod 61 connected to the cam and extended upwardly through a bore in the pull rod 53 supports the cam assembly within the housing.

Attaching of the described chuck assembly to the stud is had by simply rotating the eccentric cam 60 against the action of the spring to open the jaw members as the chuck is positioned over the end of the stud. With the chuck in position the cam is again rotated and the action of spring 59 snaps the jaw member closed onto the stud. Positioning of the chuck on the stud is facilitated by a 45° bevel on the inner periphery of the jaws which functions as a stop with respect to a similarly beveled angle on the first stud thread.

As shown, the housing 57 and the jaws 58 are provided with co-operating inclined camming surfaces 57A and 58A, respectively, which tend to hold the jaws tightly onto the stud when a load is applied. Thus it will be noted that as the load is increased, the tighter the jaw members 58 are brought to bear onto the stud. Upon release of the load, the jaws are opened by the rotation of the cam, thus permitting the tensioner to be removed.

While the chuck mechanism 56 can be adapted to conventional stud threads, a modified stud design may be resorted to as illustrated. As shown the upper end 24A of the stud 24 is provided with a reduced portion having a series of spaced lands 24C. This arrangement thus prevents attachment of the pull rod 53 to the more fragile threads 24B required for the nut. Also the more fragile threads 24B are not required to extend any great distance above the nut and thus will not be exposed to damage in service. In order that the chuck housing 57 may be maintained in alignment, a resilient alignment ring 61A is provided to space the housing 57 within the bore 26 of the pedestal 21.

With the arrangement described it is to be noted that the stud 24 need not support the entire weight of the tensioner. Only the weight of the pull rod assembly 23 rests on the stud. Also, as the pull rod 53 is connected to the pedestal-power pack unit through only the thrust nut 54, the pull rod 53 can be readily disassembled therefrom. Thus it will be apparent that the pedestal-power unit assembly can be readily adapted to studs of varying sizes in that only the pull rod is required to mate with the stud; the range of stud sizes being determined by the spread limitation of the jaw assembly. Thus the interchangeability of the described design to a number of different stud sizes results in a considerable saving and adds much to the versatility of the tool.

The operation of the tensioner is as follows:

When the pedestal power pack unit is positioned on the flange of the vessel and the pull rod 53 connected to the pistons of the power pack unit at one end and to the stud at the other end as shown in FIGS. 1 and 7, hydraulic pressure is introduced into each of the fluid chambers. The pressure of the fluid acting on each of the piston heads 48 forces the piston rod 47 upwardly. The force exerted by the movement of the piston in turn is transmitted through the thrust nut 54 to the pull rod 53, thereby causing the stud to be elongated. Meanwhile the reactive force is imparted through the pedestal to the flange causing the flange closure and pressure vessel body to be drawn together. This compression at the junction of the flange closure and vessel produces a flange rotation under heavy loads which in turn will cause axial misalignment to occur between the centerline of the tensioner and the stud. Unless this is compensated for, a bending load is imparted to the tensioner and stud. This undesirable bending load can seriously damage the tensioner and/or the component parts of the vessel. According to this invention the arrangement of the spherical washer set 55, the resilient seating washer therefor and the tapered piston rod 47 allows for varying degrees of misalignment to occur without imposing on the system the undesirable bending loads which would otherwise occur.

With the stud thus stressed in tension or elongated a predetermined amount, the nut 33 is rotated onto the stud by rotation of the nut socket 31 through the gearing arrangement described to take up and retain the stud elongation. With the nut 33 turned down and the fluid pressure relieved, the load is taken off the tensioner and the conical spring 52 returns the piston assembly to start position. The pull rod 53 may then be released from the stud and the entire tensioner indexed onto the next stud.

FIG. 3 illustrates a modified form of a chuck mechanism for use with the tensioner herein described. As shown it comprises a chuck housing 80 which is threaded at one end to the pull rod 53. The other end of the housing is provided with an inturned flange 81 defining an opening 82 for receiving the upper end 24A of a stud. Pivoted within the housing are a plurality of jaw members 83, as for example 6 jaw members spaced at 60° intervals. Means for pivoting the jaw members 83 within the housing comprise a protruding or bead like portion 84 at the lower outer edge of each jaw member seated in a corresponding groove or recess 85 at the juncture of the flange 81 and the internal vertical surface 86 of the housing. Thus the jaw members can pivot or rock between inoperative open position and operative closed position with respect to the stud. In the operative closed position, the lands and grooves 83A and 83B on the inner face of the jaw members are brought into mating relationship with corresponding pull grooves and lands on the stud.

Means for actuating the jaw members 83 between open and closed position consist of a bell crank lever 87 connected to each jaw member. Each lever 87 is pivotally connected to a shoulder portion of the housing so that one end 87A of the lever is pivotally connected to the upper portion of its respective jaw member and the other end 87B of the lever is connected to a common operator 88. A control rod 89 projecting upwardly through a bore 90 in the pull rod 53 connects with the operator 88. As hereinbefore described the housing flange 81 is provided with an angled face 81A which is adapted to mate with a complementary angled surface 24D on the first thread to form a limit stop therefor.

In operation, with the chuck housing 80 in position on the upper end of the stud as shown in FIG. 3, an upward pull on the control rod 90 will cause the jaws 83 to be pivoted inwardly onto the end of the stud, the pull grooves and lands of the jaws mating with the pull grooves and lands of the stud as the jaws closed onto the stud. Thus when the tensioner is loaded, the force exerted on the pull rod 53 will cause the flange 81 of the chuck housing to bear on jaws 83 in a manner so as to urge or rotate them inwardly toward the stud. Thus, as the load is increased the tighter becomes the gripping action of the jaw members 83 on the stud. When the load on the tensioner is relieved, the jaw members 83 are released from the stud by a downward stroke of the control rod 90, thus causing the levers 87 to pivot the jaws to open position.

Another modified form of a chuck mechanism is illustrated in FIG. 4. In this form a threaded collar 99 is disposed between the pull rod 53 and housing 100. The jaw members 101 are pivotally connected to the housing by means of projecting or bead like portions 101A similar to those described for FIG. 3. However, in this form of the invention the jaw members 101 are maintained in normally open position by a suitable split ring spring means 102. The actuating means for moving the jaws 101 from normally open to closed position consists of an inverted cup shaped member 103 having inclined camming surfaces 104 on the inner face thereof adjacent the open end, the member 103 being connected to a control rod 105 for raising and lowering the cup member 103 relative to the jaw members 101. In operation, to close the normally open jaws 101 onto the stud 24 as shown in FIG. 4, the control rod is pushed downwardly causing the inclined surfaces 104 of the cup member 103 to engage and cam the jaws 101 inwardly into closed position. Thus, when the load is applied to the pull rod, the internal flange 108 of the housing 100 acting on the jaws urges the jaw members toward the stud. Consequently as the load on the pull rod 53 is increased, the tighter becomes the grip of the jaw members on the stud as hereinbefore described with reference to FIG. 3. Release of the jaws from the stud is attained by an upward movement of the control rod 105, thereby permitting member 103 to free the jaws, and the action of the spring 102 returns each jaw member to its normal open position.

Figure 5:
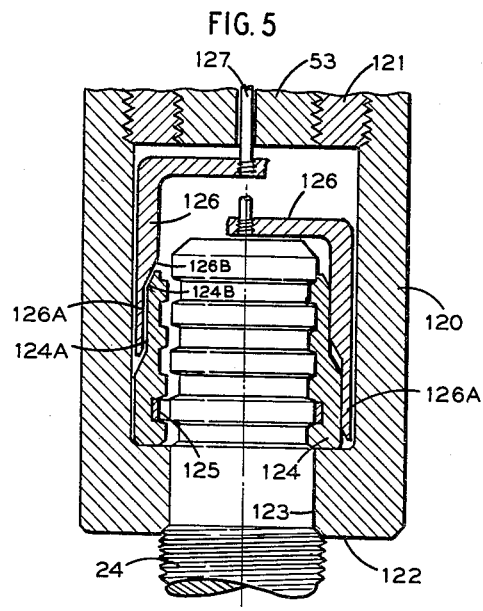
FIG. 5 is a composite longitudinal sectional view of still another modified embodiment of the stud gripping means illustrated in operative and inoperative position.

FIG. 5, a composite view, illustrates still another modified embodiment of a chuck mechanism. As shown, this form consists of a chuck housing 120 which is threaded to a collar 121, which in turn is threaded to the end of the pull rod 53. The other end of the housing 120 is provided with an inturned flange 122 defining an opening for receiving the upper end of stud 24. In this form three jaw members 124, spaced at 120°, are positioned within the housing and are maintained in normal open position therein by a suitable split ring spring means 125. As shown, the upper end portion 124A of each jaw member is reduced in section so that in normal open position the outer surface of the reduced section is spaced from the inner surface of the housing.

An actuator sleeve comprising an inverted cup shape member 126 is provided. It has adjacent the open end thereof a reduced section 126A which is adapted to be received in the space between the upper jaw portion 124A and the wall of the housing. A control rod 127 is connected to the cup member 126 to raise and lower the same, the control rod 127 extending upwardly through a bore in the center of the pull rod 53. Both portion 124A of the jaw members and portion 126A of member 126 are provided with co-operating inclined cam surfaces 124B, 126B. Thus when the control rod is pushed downwardly toward the stud, the member 126 is moved from the raised position as shown in the left portion of the composite FIG. 5 to a lower position, as shown in the right portion of FIG. 5. In moving to the lower position, the cup member 126 cams the jaw members 124 inwardly into gripping relationship with the stud 24. When the tensioner is loaded, the cup member 126 becomes wedged between the jaw member 124 and the inner surface of the housing thus insuring a firm grip. After the load of the tensioner is relieved, the jaw members 126 are released by raising member 126 to normal inoperative position; and the spring 125 returns the jaw members to their normal open position. The inner periphery of the flange 122 is also angled as herein described with reference to FIGS. 1 and 3 to mate with a corresponding chamfer or angle on the first thread to form a limit stop.

Figure 6:
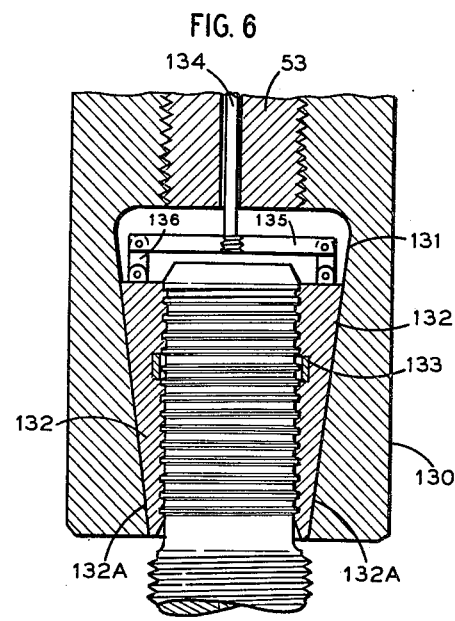
FIG. 6 is still a further longitudinal sectional modified embodiment.

FIG. 6 illustrates still another embodiment of a chuck mechanism in operative position. In this form the housing 130 is provided with a bore 131 which tapers downwardly and inwardly. In this form two jaw members 132 spaced at 180° apart are maintained in normal open position by suitable spring means 133, the outer surface 132A of each jaw member being inclined and in camming engagement with the inclined surfaces 131 of the housing. A control rod 134 extending upwardly through the bore of the pull rod 53 has connected to the lower end thereof a transversely extending jaw lifter 135. Connected to each end of the lifter 135 is a link 136 pivotally connected to the lifter and to the adjacent jaw 132.

In operation with the chuck housing 130 disposed about the upper end of the stud 24 and with the jaws normally open the lifter 135 is lowered to position the jaws opposite the stud. As the load is applied to the tensioner, the pull rod 53 and the housing 130 connected thereto is moved upwardly due to the action of the piston on the pull rod as hereinbefore described. This in turn causes the inclined surfaces 131 of the housing to cam the jaw members into operative closed position onto the stud. Thus it will be noted that as the load is increased the tighter the jaw members will tend to grip the stud. To release the chuck mechanism, the load on the tensioner is relieved causing the pull rod and housing connected thereto to recede toward the stud. As the housing recedes, the spring action on the jaw members moves the jaws to their normal inoperative open position.

While the instant invention has been disclosed with reference to a particular method and a particular embodiment for practising the same, it is to be appreciated that the invention is not to be taken as limited to all of the details thereof as modifications and variations thereof may be made without departing from the spirit or scope of the invention.

What is claimed is:

1. A stud tensioner comprising a pedestal means adapted to fit over a stud to be stressed in tension, a pull rod having means on one end thereof to engage the end of the stud, said pull rod forming an axial extension of the stud, a power pack means connected to said pedestal means, said power pack means including a cylinder and piston assembly having a hollow piston rod through which said pull rod extends, means for readily connecting and disconnecting the other end of said pull rod to said power pack means, means to provide relative movement between the cylinder and piston of said assembly for transmitting a force in tension to said stud, and means for eliminating binding between the piston and cylinder of said assembly due to misalignment between the centerlines of the tensioner and the stud as the stud is stressed in tension.

2. The invention as defined in claim 1 wherein said piston includes a piston head having an arcuate peripheral edge portion forming a line contact with the internal wall portion of said cylinder.

3. A stud tensioner comprising a pedestal adapted to receive a stud to be stressed in tension, a pull rod having means on one end thereof to engage the end of the stud, a power pack means connected to said pedestal means, said power pack means including a cylinder and piston having a head connected to a hollow piston rod slidably mounted within said cylinder, said pull rod forming an axial extension of the stud which projects upwardly through said pedestal and said hollow piston rod, means connecting the other end of said pull rod to said power pack means, means disposed on one side of said head for introducing fluid under pressure into said cylinder to provide relative movement between the cylinder and piston to transmitting a force in tension to said stud, means disposed on the other side of said head to relieve any build up of fluid pressure thereat and means for eliminating binding between the piston and cylinder of said assembly due to misalignment between the centerlines of the tensioner and the stud as the stud is stressed in tension.

4. In combination with a high pressure open end pressure vessel having a removable flanged cover secured thereto by a plurality of stud and nut assemblies, a stud tensioner for stressing said studs comprising a pedestal arranged to fit over a stud and nut assembly whereby the base of said pedestal rests entirely within the periphery of the flange of said cover, a pull rod having means on one end thereof to engage the end of the stud of said assembly, said pull rod forming a substantially axially aligned extension of said stud and projecting upwardly through said pedestal, power means connected to said pedestal and said pull rod to exert a force in tension that is transmitted through said pull rod to said stud to effect an axial elongation thereof, means for alleviating problems of axial misalignment between the tensioner and the stud as the flange rotates during the stressing process, and means for turning the nut on said stud in the stressed position thereof.

5. For use with an open end pressure vessel having a removable cover secured thereto by a plurality of stud and nut assemblies, a stud tensioner for stressing said studs a predeterminate amount comprising a pedestal adapted to fit over a stud and nut assembly securing said cover to said vessel, a pull rod having means on one end thereof to engage the end of the stud of said assembly, said pull rod forming a substantially axially aligned extension of said stud and projecting upwardly through said pedestal, a power means connected to said pedestal and pull rod to exert a force in tension which is transmitted through said pull rod to said stud to effect an axial elongation thereof, and means for alleviating the difficulties of axial misalignment occurring between the tensioner and the stud, said misalignment means including a spherical washer set whereby relative movement of the washers of said set provides for angle displacement of the axis of said tensioner relative to said stud and thereby obviates undesirable bending loads thereon.

6. The invention as defined in claim 5 including a resilient and readily flowable member, said member forming a seat for said spherical washer set.

7. For use with a high pressure, open end pressure vessel having a flanged cover removably secured thereto by a plurality of stud and nut assemblies, a stud tensioner for stressing said studs comprising a pedestal arranged to fit over a stud and nut assembly whereby the base of said pedestal rests entirely within the periphery of the flange of said cover, a power means including a cylinder connected to said pedestal, a piston having a head connected to a hollow piston rod slidably mounted within said cylinder, a pull rod having means on one end thereof to engage the end of the stud of said assembly, said pull rod forming a substantially axially aligned extension of said stud which projects upwardly through said pedestal and hollow piston rod, a thrust nut connecting said pull rod to said piston, means disposed on one side of said piston head for introducing a fluid under pressure into said cylinder to provide relative movement between the cylinder and piston to exert a force in tension on said pull rod which in turn is transmitted to said stud secured to said pull rod to effect axial elongation of the stud, a fluid relief means disposed on the other side of said piston head to relieve any fluid pressure build up thereat and means for turning said nut on said stud in the stressed position thereof.

8. For use with a high pressure, open end pressure vessel having a flanged cover removably secured thereto by a plurality of stud and nut assemblies, a stud tensioner for stressing said studs comprising a pedestal arranged to fit over a stud and nut assembly whereby the base of said pedestal rests entirely within the periphery of the flange of said cover, a power means including a cylinder connected to said pedestal, a piston having a head connected to a hollow rod slidably mounted within said cylinder, a pull rod having means on one end thereof to engage the end of the stud of said assembly, said pull rod forming a substantially axially aligned extension of said stud which projects upwardly through said pedestal and hollow piston rod, a thrust nut connecting said pull rod to said piston, means disposed between said thrust nut and piston to compensate for misalignment between the tensioner and said stud, means disposed on one side of said piston head for introducing a fluid under pressure into said cylinder to provide relative movement between the cylinder and piston so as to exert a force in tension on said pull rod which in turn is transmitted to said stud secured thereto to effect axial elongation of the stud, a fluid relief means on the other side of said piston to relieve any fluid pressure build up thereat and means for rotating said nut on said stud in the stressed position thereof.

9. For use with a high pressure, open end, pressure vessel having a flange cover removably secured thereto by a plurality of stud and nut assemblies, a stud tensioner for stressing said studs comprising a pedestal arrangement to fit over a stud and nut assembly whereby the base of said pedestal rests entirely within the periphery of the flange of said cover, a power means including a cylinder connected to said pedestal, a plurality of vertically spaced, axially aligned annular members partitioning said cylinder into a plurality of chambers, a piston slidably mounted within said cylinder, said piston having a hollow piston rod in axial alignment with said annular members and a plurality of piston heads spatially connected to said hollow rod whereby a piston head is disposed in each of said chambers, a pull rod having a quick acting, readily releasable, stud gripping means on one end thereof to engage the end of the stud of said assembly, said pull rod forming a substantially axially aligned extension of said stud and projects upwardly through said pedestal and hollow piston rod, a thrust nut connecting said pull rod to said piston, a spherical washer set disposed between said thrust nut and piston to compensate for misalignment between the tensioner and said stud, a fluid inlet connection for each of said chambers through which fluid under pressure is introduced on one side of the respective piston heads thereby exerting a force in tension to said pull rod which in turn is transmitted to said stud to effect axial elongation of the stud, a fluid relief means for each of said chambers disposed on the other side of the respective piston head thereof for relieving any build up of fluid pressure thereat and means for turning said nut on said stud in the stress position thereof.

10. A stud tensioner comprising a pedestal having an axial bore adapted to receive a stud to be stressed in tension, a power means including a cylinder connected to said pedestal, a piston slidably mounted within said cylinder, said piston including a piston rod and a piston head connected thereto, said piston rod having a tapered bore extending therethrough, a pull rod having means on one end thereof to engage the end of the stud, said pull rod forming a substantially axially aligned extension of said stud which projects upwardly through the bore of said pedestal and the bore of said piston rod, the bore of said piston rod being tapered downwardly and outwardly to provide clearance within the piston rod for the pull rod to adjust for misalignment between the tensioner and the stud, and a thrust nut connecting said pull rod to said piston.

11. The invention as defined in claim 10 including resilient means disposed within the bore of said pedestal for maintaining said stud engaging end of said pull rod in alignment with said stud.

12. For use with a high pressure, open end, pressure vessel having a flanged cover removably secured thereto by a plurality of stud and nut assemblies, a stud tensioner for stressing said studs comprising a pedestal having an axial bore to receive a stud and nut assembly whereby the base of said pedestal rests entirely within the periphery of the flange of said cover, a power means including a cylinder connected to said pedestal, a plurality of vertically spaced partitions having axially aligned openings therein dividing said cylinder into a plurality of chambers, a piston slidably mounted within said cylinder, said piston including a piston rod wth a tapered bore in alignment with the opennngs of said portions and a plurality of piston heads spatially connected to said piston rod so that a piston head is disposed in each of said chambers, a pull rod having a quick acting, readily releasable stud gripping means on one thereof to engage the end of the stud of said assembly, said pull rod forming a substantially axially aligned extension of said stud and projects upwardly through the bores of said pedestal and piston rod, the bore of said piston rod being tapered downwardly and outwardly to provide clearance for the pull rod, resilient means disposed within the bore of said pedestal for positioning the stud engaging end of said pull rod in alignment with said stud, a thrust nut connecting said pull rod to said piston, a spherical washer disposed between said thrust nut and piston to compensate for misalignment between the tensioner and said stud, a fluid inlet connection disposed in each of said chambers through which fluid under pressure is introduced on one side of each of said piston heads thereby exerting a force in tension to said pull rod which in turn is transmitted to said stud to effect axial elongation of the stud, a fluid relief means for each of said chambers on the other side of the respective piston heads for relieving any build up of fluid pressure thereat and means disposed in the base of said pedestal for turning said nut on said stud in the stress position thereof.

13. For use with a high pressure, open end, pressure vessel having a flanged cover removably secured thereto by a plurality of stud and nut assemblies, a stud tensioner for stressing said studs comprising a pedestal having an axial bore to receive a stud and nut assembly whereby the base of said pedestal rests entirely within the periphery of the flange of said cover, a power means including a cylinder connected to said pedestal, a plurality of vertically spaced partitions having axially aligned openings therein whereby said partitions dividing said cylinder into a plurality of chambers, a piston slidably mounted within said cylinder, said piston having a piston rod with a tapered bore, said piston rod being in alignment with the openings of said partitions and a plurality of piston heads spatially connected to said piston rod so that a piston head is disposed in each of said chambers, a pull rod having a quick acting, readily releasable stud gripping means on one end thereof to engage the end of the stud of said assembly, said pull rod forming a substantially axially aligned extension of said stud and projects upwardly through the bores of said pedestal and piston rod, the bore of said piston rod being tapered downwardly and outwardly to provide clearance for the pull rod, resilient means disposed within the bore of said pedestal for positioning the stud engaging end of said pull rod in alignment with said stud, a thrust nut connecting said pull rod to said piston, a spherical washer disposed between said thrust nut and piston to compensate for misalignment between the tensioner and said stud, a fluid inlet connection disposed in each of said chambers through which fluid under pressure is introduced on one side of each of said piston heads thereby exerting a force in tension to said pull rod which in turn is transmitted to said stud to effect axial elongation of the stud, a fluid relief means for each of said chambers on the other side of the respective piston heads for relieving any build up of fluid pressure thereat, means disposed in the base of said pedestal for turning said nut on said stud in the stress position thereof, said nut turning means including a geared nut socket for engaging said nut, and a worm gear in meshing relationship with said socket whereby rotation of said worm effects the turning of said nut socket.

14. A stud tensioner comprising a pedestal having a bore for receiving a stud and nut, a pull rod having an end portion extending into the bore of said pedestal, a readily releasable chuck assembly connected to said end of the pull rod for securing said rod to the stud, said rod when secured to the stud forming a substantially axially aligned extension thereof, means connected to said pedestal and pull rod to exert a force in tension which is transmitted through said pull rod to the stud to effect axial elongation of the stud, means connected with said assembly for compensating for axial misalignment between the tensioner and the stud, said chuck assembly including a chuck housing connected to said end portion of said pull rod, jaw members disposed in said housing, means for closing said jaws for securely gripping the end portion of the stud, means for moving said jaw members to open position and a resilient alignment ring for maintaining said chuck assembly in alignment with the stud.

15. In combination with a high pressure open end pressure vessel having a removable flanged cover secured thereto by a plurality of stud and nut assemblies; the improvement wherein each of said assemblies includes a stud having a threaded portion for receiving a nut and an upper threaded end portion of reduced diameter, a stud tensioner including a pedestal having a bore for receiving the stud and nut assembly, a pull rod having an end portion extending into the bore of said pedestal, a quick acting chuck means connected to said end of the pull rod for securing the rod to the stud, said chuck means engaging the reduced upper end of said stud, said rod when secured to said stud forms a substantially axially aligned extension thereof, means connected to said pedestal and pull rod to exert a force in tension that is transmitted through said pull rod to the stud to effect axial elongation of said stud, and means for compensating for axial misalignment between the tensioner and the stud.

16. The invention as defined in claim 15 wherein said chuck means comprises a chuck housing connected to said pull rod, movable jaws disposed in said housing, means yieldingly biasing said jaws in normally closed position, said housing and jaws having co-operating camming surfaces for tightening the grip of the jaws onto said stud as the load on the pull rod is increased, means for camming said jaws to open position, and a control rod for operating said camming means for moving said jaws to open position.

17. The invention as defined in claim 15 wherein said chuck means comprises a chuck housing connected to the end of said pull rod, movable jaws disposed in said housing, means biasing said jaws to normally open position, an actuator sleeve slidably mounted in said housing, said sleeve and jaws having co-operating camming surfaces, and a control bar connected to said sleeve for sliding said sleeve within said housing to engage said camming surfaces so that said jaws close onto said stud.

18. The invention as defined in claim 15 wherein said chuck means comprises a chuck housing connected to the end of said pull rod, a plurality of movable jaws, members pivotally mounted to said housing, means for positively opening and closing said jaws, said latter means including a plurality of bell cranks pivoted to said housing, one arm of each of said cranks being connected to its respective jaw member, and a control bar, said control bar being operatively connected to the other arm of each of said cranks whereby actuation of said control rod pivots said bell cranks to move said jaws between open and closed position.

19. The invention as defined in claim 15 wherein said chuck means comprises a chuck housing having an inwardly extending flange defining an opening for receiving the reduced portion of said stud, a plurality of movable jaws pivotally disposed within said housing, means normally biasing said jaws to open position, an actuator sleeve slidably mounted within said housing, said sleeve and jaws having co-operating camming surfaces, and a control bar connected to said sleeve for sliding said sleeve within said housing to engage said camming surfaces whereby said jaws are forced to close onto the end of said stud.

20. The invention as defined in claim 15 wherein said chuck means comprises a chuck housing connected to the end of said pull rod, a plurality of jaw members disposed within said housing, means normally biasing said jaws to open position, and means for lifting said jaws relative to said housing to position said jaws relative to said stud, said housing and jaw having co-operating camming surfaces for closing said jaws onto said stud as the load on the pull rod is increased.

21. A stud tensioner comprising a pedestal having a bore for receiving a stud and nut, a pull rod having an end portion extending into the bore of said pedestal, a readily releasable chuck assembly connected to said end of the pull rod for securing said pull rod to the stud, said rod when secured to the stud forming a substantially axially aligned extension thereof, a cylinder and piston assembly connected to said pedestal and pull rod to exert a force in tension which is transmitted through said pull rod to the stud to effect axial elongation of the stud, means connected with said assembly for compensating for axial misalignment between the tensioner and the stud to minimize any bending action between the cylinder and piston, and a resilient alignment ring for maintaining said chuck assembly in alignment with the stud.

22. A tensioner for tightening a stud and mating nut for securing a plurality of fabricated members together comprising a power pack means, said power pack means including a cylinder and piston exerting a fluid pressure for initially applying a predetermined axial stress to the stud to effect axial elongation thereof before tightening the nut thereon, and means positioned at the end of the power pack means to compensate for misalignment occasioned between the centerlines of the tensioner and the stud as the stud is stressed in tension so as to maintain the longitudinal axis of the piston in substantially coaxial relationship with the longitudinal axis of said cylinder to minimize the effects of binding between the piston and cylinder.

References Cited in the file of this patent

UNITED STATES PATENTS

| | | |
|---|---|---|
| 2,544,522 | Bertelsen | Mar. 6, 1951 |
| 2,631,485 | Stuart et al. | Mar. 17, 1953 |
| 2,734,412 | Orner | Feb. 14, 1956 |
| 2,736,219 | May | Feb. 28, 1956 |
| 2,756,622 | La Belle | July 31, 1956 |
| 2,760,393 | Stough | Aug. 28, 1956 |
| 2,792,790 | Capps | May 21, 1957 |
| 2,820,382 | Smith | Jan. 21, 1958 |
| 2,866,370 | Biach | Dec. 30, 1958 |
| 2,885,919 | Carlson | May 12, 1959 |
| 2,889,729 | Orner | June 9, 1959 |
| 2,889,855 | Neville et al. | Aug. 18, 1959 |